Figure 1:
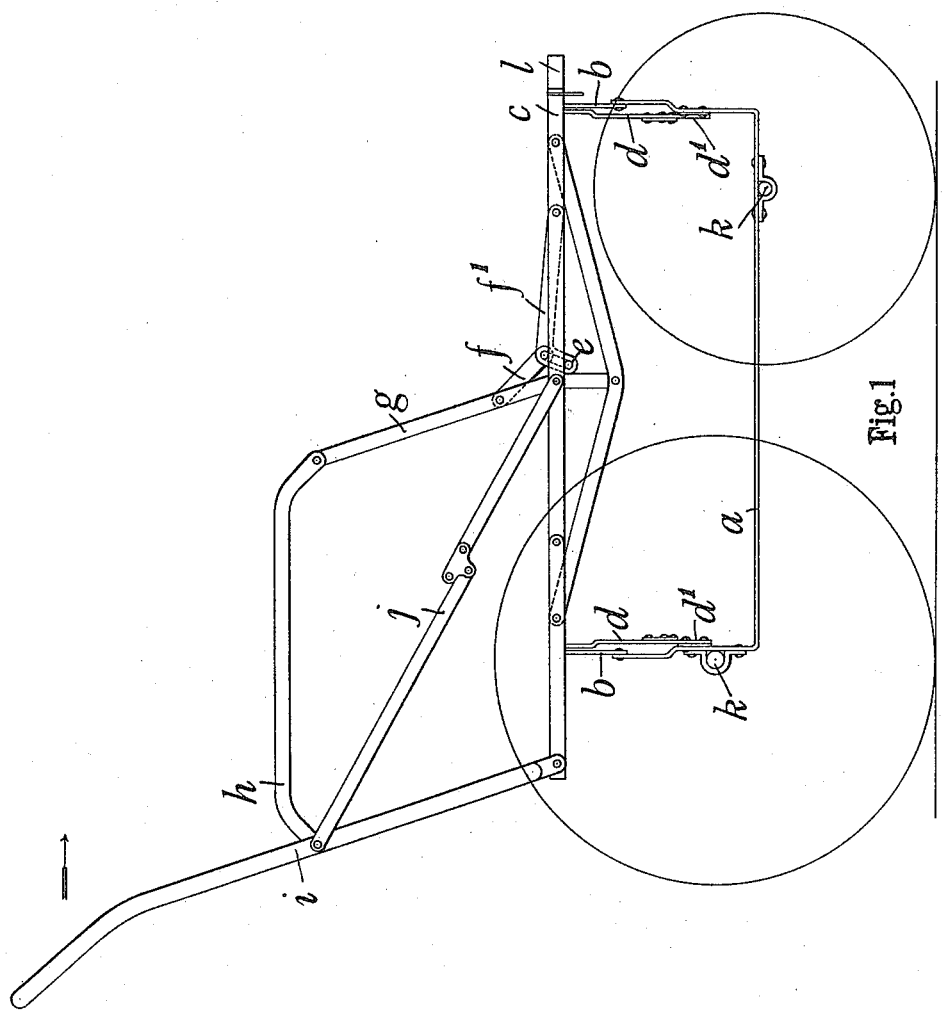

F. H. HEADLEY.
BASSINET PERAMBULATOR OR THE LIKE.
APPLICATION FILED JUNE 3, 1912.

1,161,212.

Patented Nov. 23, 1915.
2 SHEETS—SHEET 1.

WITNESSES

INVENTOR
Frederick Hagger Headley
BY
ATTORNEYS

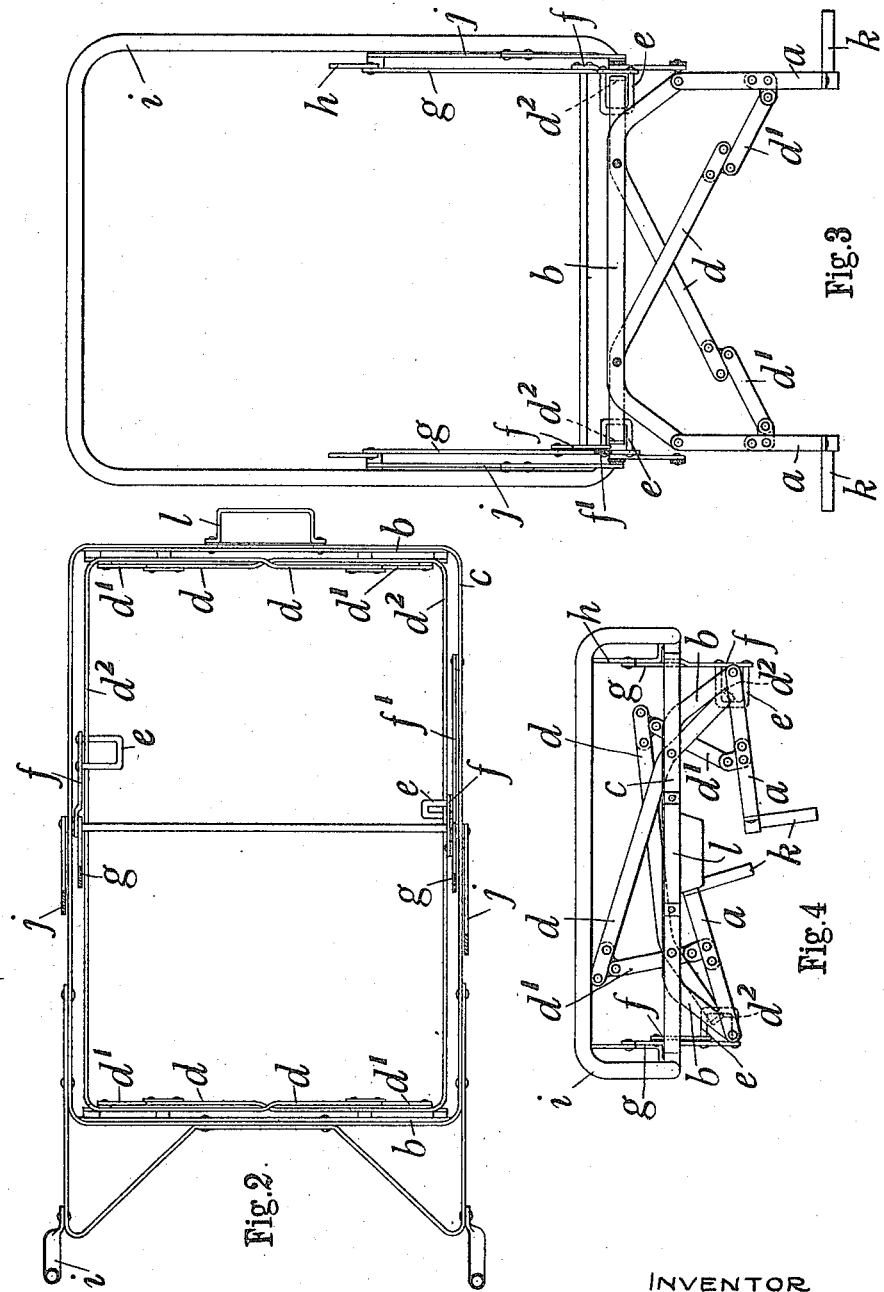

UNITED STATES PATENT OFFICE.

FREDERICK HAGGER HEADLEY, OF EDGBASTON, BIRMINGHAM, ENGLAND.

BASSINET-PERAMBULATOR OR THE LIKE.

1,161,212.

Specification of Letters Patent.   Patented Nov. 23, 1915.

Application filed June 3, 1912.   Serial No. 701,186.

*To all whom it may concern:*

Be it known that I, FREDERICK HAGGER HEADLEY, subject of the King of Great Britain, residing at 65 Stirling road, Edgbaston, in the city of Birmingham, England, have invented certain new and useful Improvements relating to Bassinet-Perambulators or the like, of which the following is a specification.

This invention relates to bassinet perambulators or baby carriages of the folding or collapsible type, and has for its object to provide in a simple and convenient manner for the ready folding and extension of the carriage and for effectively stiffening the same to give the desired rigidity when in the service position.

The invention comprises the combination with the pivotally mounted underframe members carrying the vehicle wheels, of strut members or their equivalent formed of jointed parts and pivoted upon or in connection with the main underframe or body of the vehicle, and means for imparting relative movements to the said parts for the purpose of extending and fixing the wheel carrying underframe members in the service position or releasing and folding the same into the out of service position.

Referring to the two accompanying sheets of explanatory drawings:—Figures 1, 2 and 3 are respectively side elevation, sectional plan and end elevation of the frame work of a baby carriage having this invention applied thereto, the parts being shown in the extended or service position. Fig. 4 is an end elevation of the frame work in the closed position.

The same reference letters in the different views indicate the same parts.

In carrying the invention into effect as shown, the wheel carrying underframe members $a$, comprising plain bars with upturned ends, are pivotally mounted upon the downwardly projecting extremities of the bars $b$ secured to the main underframe $c$ of the vehicle. Each end of each of the aforesaid wheel carrying members $a$ is connected to a strut $d$ pivoted upon the main underframe $c$. Between its pivot and its point of connection with the wheel carrying member each strut is not continuous or formed of one piece but is formed of two pieces ($d\ d'$) which are so jointed as to permit of relative angular movement of the parts. The construction of joint shown (which forms no part of this invention) serves to prevent relative movement of the pieces in one direction beyond the position illustrated.

At each end of the main underframe there are two jointed struts such as aforesaid, the one serving for the wheel carrying member on the one side and the other for the like member on the opposite side of the vehicle. The two jointed struts (one at each end of the main underframe) connected to one wheel carrying member are extended beyond their pivot connections with the main frame and united by a bar $d^2$ which is engaged by the loop $e$ on the extremity of an operating lever $f$. The two struts $d$ connected to the same wheel frame and the bar $d^2$ are preferably made integrally from a single piece of metal strip as shown. Similarly the two jointed struts (one at each end of the main underframe) connected to the other wheel carrying member are likewise extended and united and engaged by an operating lever. The operating lever on the one side (the upper side in the plan at Fig. 2) is made longer than the one on the other side and the latter is connected by a radius bar $f'$ at one end to the frame $c$ in order to get a more rapid movement of the strut and wheel frame on the one side in the closing operation to prevent the two wheel frames fouling or obstructing each other. The loop $e$ is riveted to one end of the lever $f'$, and the lever $f$ on that side pivoted to the same end of the lever $f'$, one portion of the loop being used to form the pivot pin. Also the longer lever $f$ is rigidly connected to its handle frame member $g$, while the shorter lever $f$ on the opposite side and the radius bar $f'$ are pivoted to their respective members $g$ and $c$. The elements aforesaid are so arranged that the lever $f$ on the one side operates the wheel carrying member on the opposite side of the vehicle. Connection between the handle and loops $e$ is effected through the handle frame members $g$ and $h$. The handle or handle frame is retained in its service position by jointed struts $j$ or in any other ordinary manner. On the movement of the handle in the direction of the arrow relatively to the underframe, after the release of the struts or their equivalent, the loops $e$ at the extremities of the operating levers $f$ so act upon the bars $d^2$ of the struts $d\ d'$, that relative angular movements are given to the jointed parts of the struts, and the wheel carrying members which they normally retain in position are drawn in or folded together as shown in Fig. 4. The wheels are omitted from the drawings for clearness but the wheel spindles are shown and denoted by $k$. The handle or handle frame also folds over in the well understood manner.

The struts need not necessarily be worked by or from the handle, but may be operated by independent levers which may be locked by throwing into a dead center position.

To extend the frame from the collapsed to the service position and secure the same in such position a reverse movement is given to the handle or handle frame. For convenience in manipulating the frame in the closing and extending operation a handle $l$ is provided at one end.

Having thus described my invention what I claim as new and desire to secure by Letters Patent is:—

1. In a go-cart a main frame, a collapsible superstructure thereon, foldable wheeled members pivotally mounted beneath each side of the main frame, strut members pivotally connected to the main frame and to each wheeled member, each said strut member comprising a pair of pivotally connected parts, and an actuating member connected with the collapsible superstructure at each side and in each case operating on one of the parts belonging to the opposite wheeled member.

2. In a go-cart a main frame, wheel-carrying members pivoted to said frame, combined operating and locking mechanisms pivotally connected to said frame and to each wheel-carrying member, each said operating and locking mechanisms including a longitudinal bar, and an actuating lever operating on said bar to swing the sub-frames in unison with the opening and closing of the cart.

3. In a collapsible go-cart a main frame, a collapsible superstructure thereon, pivotally mounted wheeled sub-frames, one beneath each side thereof, locking toggles connecting each wheeled sub-frame with the main frame, and actuating levers operatively connecting the locking toggles with the respectively opposite sides of the collapsible superstructure for swinging the wheeled frames into and out of operating position.

4. In a collapsible go-cart a main frame, a wheeled sub-frame at each side, an operating bail pivotally mounted on each side of the cart, and a link mechanism connecting each bail with the wheeled sub-frame at the opposite side of the cart for operation thereby.

5. In a collapsible go-cart a collapsible superstructure, a main frame, a pivoted wheeled sub-frame beneath each side of the main frame, toggle jointed strut-members joining each sub-frame to the main frame, and operative cross-over means connecting the strut-members with the opposite parts of the collapsible superstructure.

6. In bassinet perambulators or the like, the combination comprising a main underframe, a pair of wheel carrying members pivoted to said frame, a pair of strut members pivotally connected to the said frame and each wheel carrying member, said strut members each comprising a pair of pivotally connected parts, a bar connecting one of the parts of each pair of strut members attached to the same wheel carrying member and an actuating lever operating on said bar, substantially as described.

7. In bassinet perambulators or the like, the combination comprising a main underframe, a pair of wheel carrying members pivoted to said frame, a pair of strut members pivotally connected to the said frame and each wheel carrying member, said strut members each comprising a pair of pivotally connected parts, a bar connecting one of the parts of each pair of strut members attached to the same wheel carrying member, an actuating lever operating on said bar, and a loop connecting said lever to said bar, substantially as described.

8. In bassinet perambulators or the like, the combination comprising a main underframe, a pair of wheel carrying members pivoted to said frame, a pair of strut members pivotally connected to the said frame and each wheel carrying member, said strut members each comprising a pair of pivotally connected parts, a bar connecting one of the parts of each pair of strut members attached to the same wheel carrying member, an actuating lever operating on said bar, said lever forming part of the collapsing frame of the vehicle, and a loop connecting said lever to said bar, substantially as described.

In testimony whereof I have signed my name to this specification in the presence of two subscribing witnesses.

FREDERICK HAGGER HEADLEY.

Witnesses:
 JOHN MORGAN,
 FRANCIS MALPES.